(12) United States Patent
Majerus

(10) Patent No.: US 6,413,067 B1
(45) Date of Patent: Jul. 2, 2002

(54) MOLD OPENING APPARATUS

(75) Inventor: Joseph Majerus, Hoscheid/Dickt (LU)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 09/664,626

(22) Filed: Sep. 19, 2000

(51) Int. Cl.$^7$ ............................................... B29C 33/22
(52) U.S. Cl. ..................... 425/28.1; 425/443; 425/450.1
(58) Field of Search ............................... 425/28.1, 441, 425/443, 450.1

(56) References Cited

U.S. PATENT DOCUMENTS

| | | |
|---|---|---|
| 1,863,604 A | 6/1932 | Mattia |
| 2,832,990 A | 5/1958 | Miller |
| 3,154,814 A | 11/1964 | Fike |
| 3,460,197 A | 8/1969 | Cantarutti et al. |
| 5,190,767 A | 3/1993 | Beres et al. ............... 425/28.1 |

Primary Examiner—James P. Mackey
(74) Attorney, Agent, or Firm—Frederick K. Lacher; Bruce L. Hendricks

(57) ABSTRACT

A tire mold opener having an opening lever pivotally mounted on an upper mold half with one end of the lever positioned for engagement with a lower mold half and the other end of the lever connected to a hoist for rotating the opening lever and pushing the lower mold half away from the upper mold half to separate the mold halves and lift the upper mold half away from the lower mold half upon lifting movement of the hoist to separate the tire from the upper mold half and the lower mold half.

6 Claims, 4 Drawing Sheets

MOLD OPENING APPARATUS

TECHNICAL FIELD

This invention relates to tire mold opening and especially to opening large molds for earthmover tires using a hoist. Each of these large tires is placed in a mold having an upper mold half and a lower mold half and then cured in a heater. After curing of the tire, the mold has been transported to a mold separation floor where the lower mold half has been held against the floor by magnets. The upper mold half has then been lifted away from the lower mold half by a hoist. Difficulties have been encountered with this procedure because frequently the lower mold half is lifted off the floor during the mold separation and then falls back on the floor causing damage to the floor and to the magnets. Also, the capacity of the hoist has been substantially more than that necessary to transfer the mold because not only must the hoist lift the mold, but it must also provide the necessary force to separate the lower mold half from the upper mold half and pull the cured tire out of the mold halves.

BACKGROUND OF THE INVENTION

In U.S. Pat. No. 2,832,990, it is proposed to use parallel bars and a lever to separate mold halves. In U.S. Pat. No. 3,154,814, it is proposed to separate an upper mold half from a lower mold half by hydraulic jacks after which the upper mold half is lifted off the lower mold half by a hoist.

SUMMARY OF THE INVENTION

The present invention is directed to utilizing the hoist and the weight of the entire mold to actuate levers pivotally mounted on the upper mold half to separate the upper mold half from the lower mold half utilizing the total weight of the mold and the leverage provided to generate the force necessary to separate the mold halves and pull the tire out of the mold halves.

In accordance with one aspect of the invention, there is provided a tire mold opener for separating an upper mold half from a lower mold half characterized by a lever pivotally mounted on the upper mold half having a separating end engageable with the lower mold half, a lifting end engageable with a hoist for rotating the lever in a direction to press the separating end against the lower mold half while lifting the upper mold half away from the lower mold half to open the tire mold.

DETAILED DESCRIPTION OF THE INVENTION

Figure 1:
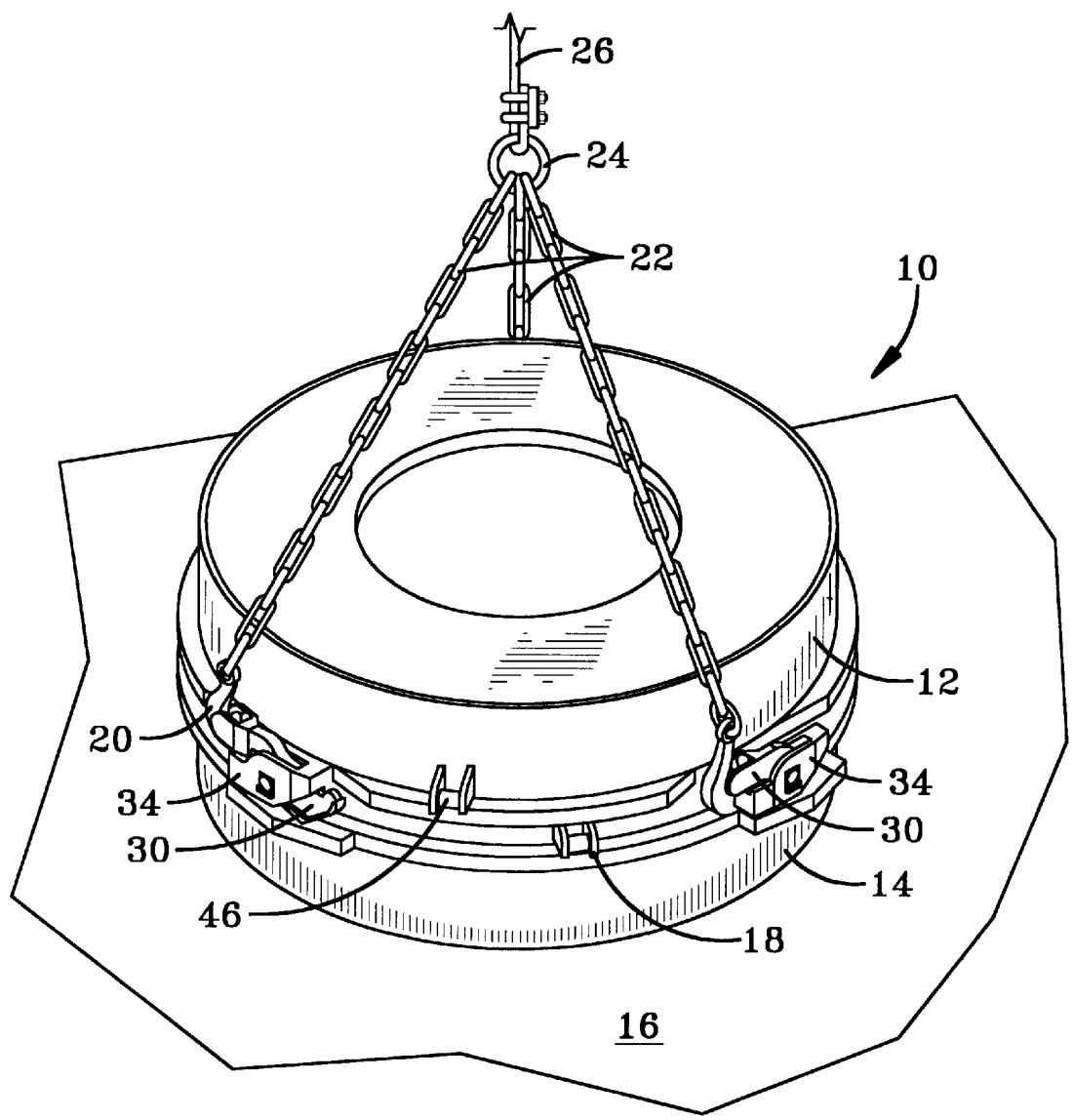
FIG. 1 is a view in perspective of the tire mold embodying the invention placed on the floor after being removed from the heater and with the opening levers connected to a chain hoist (not shown).

Referring to FIG. 1, a tire mold 10, such as the large molds used for earth mover tires is shown having an upper mold half 12 and a lower mold half 14. The mold 10 is supported on a floor 16 after being transported from a heater (not shown). Ears 18 on the lower mold half 14 may be used to transport the mold 10 from the heater to the floor 16 by a hoist (not shown) having sufficient capacity to lift the mold. The mold 10 may have a total weight of 17 to 18 tons (17,272 to 18,288 kilograms).

As shown in FIG. 1, hooks 20 on chains 22 are shown connected to a ring 24 of an opening hoist (not shown) having a cable 26. The hoist may have a capacity of ten (10) tons (1,016 kilograms) to two hundred (200) tons (203,392 kilograms) for separating the upper mold half from the lower mold half. Each of the hooks 20 are positioned for engagement with a lifting pin 28 of a lever 30 pivotally mounted on a pivot pin 32 fastened to the upper mold half 12 by a bracket 34. The lifting pin 28 is mounted on a lifting end 36 of the lever 30. At the opposite end of the lever 30 is a separating end 39 having a cam surface 41 for engaging a flange 43 on the lower mold half.

Figure 2:
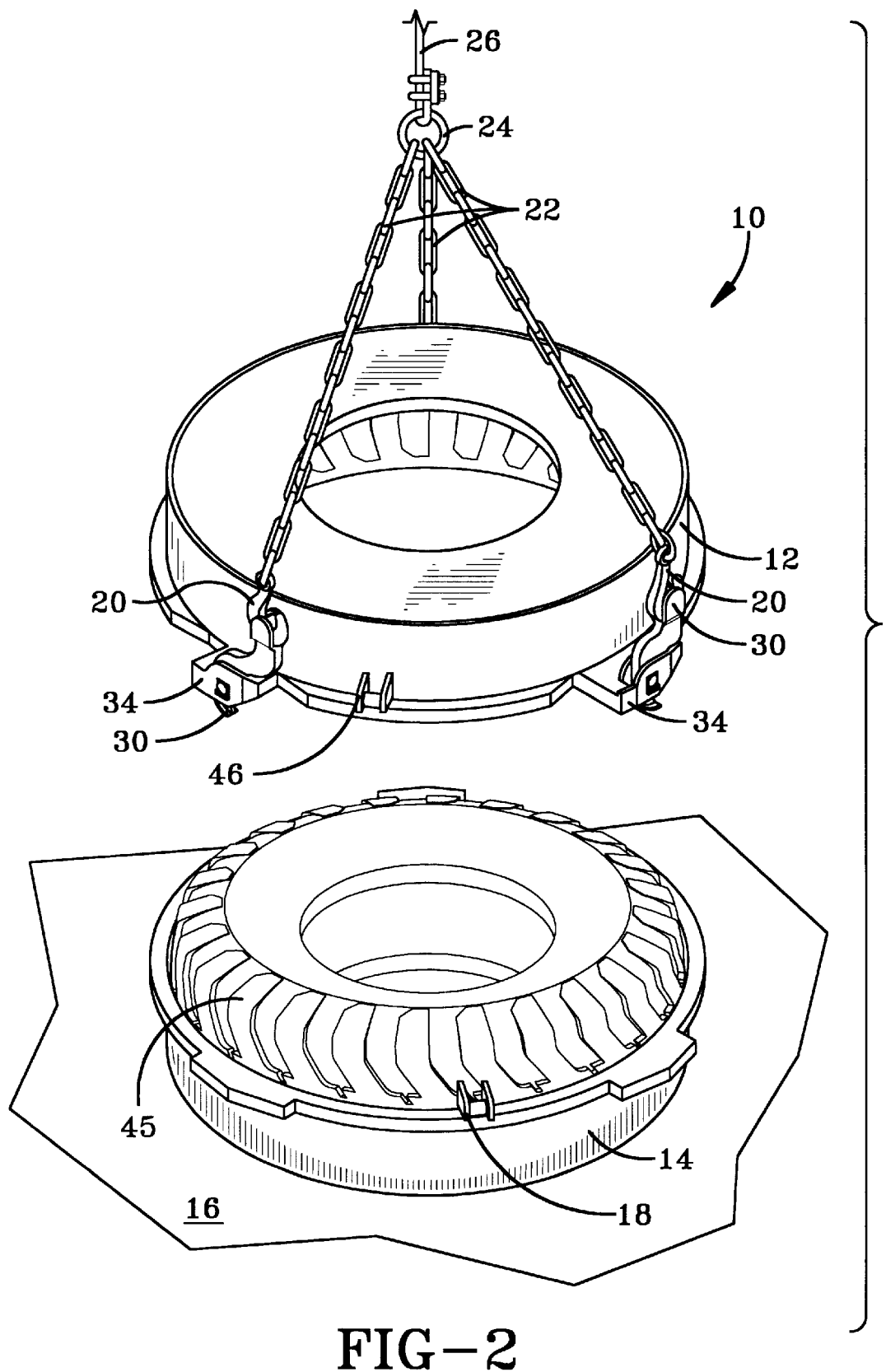
FIG. 2 is a view like FIG. 1 showing the upper mold half separated from the lower mold half after actuation of the opening levers and lifting of the upper mold half away from the lower mold half.

As shown in FIGS. 1 and 2, two brackets 34 and a third bracket (not shown) have levers 30 connected by the chains 22 to the ring 24 supported on cable 26 of the hoist. Although three assemblies of brackets 34 and levers 30 are utilized in this embodiment, it may be desirable to provide more brackets and levers in accordance with the invention.

Figure 3:
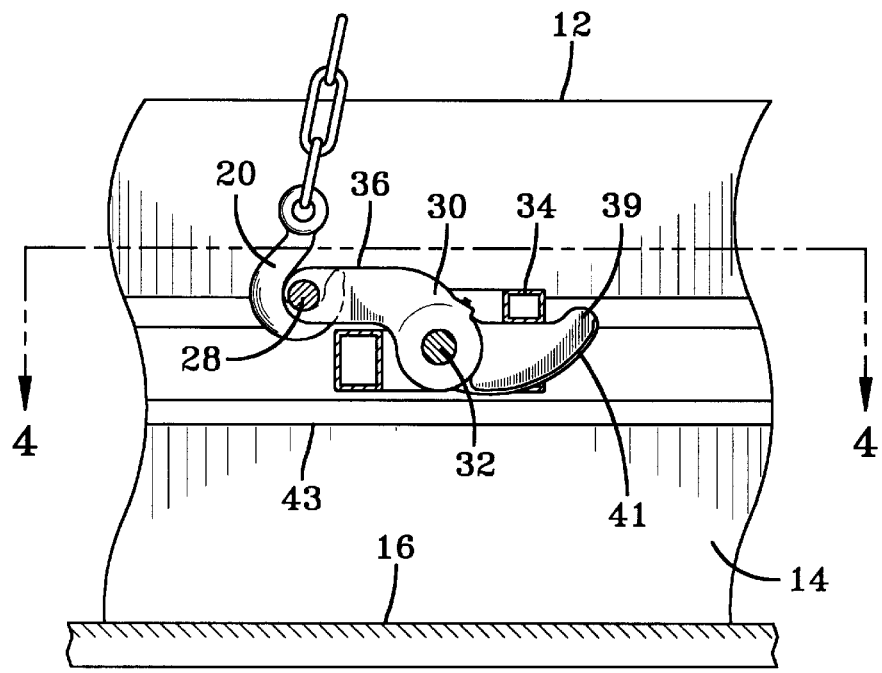
FIG. 3 is an enlarged fragmentary view with parts broken away of one of the opening levers prior to rotation by the hoist chain and hook.
Figure 6:
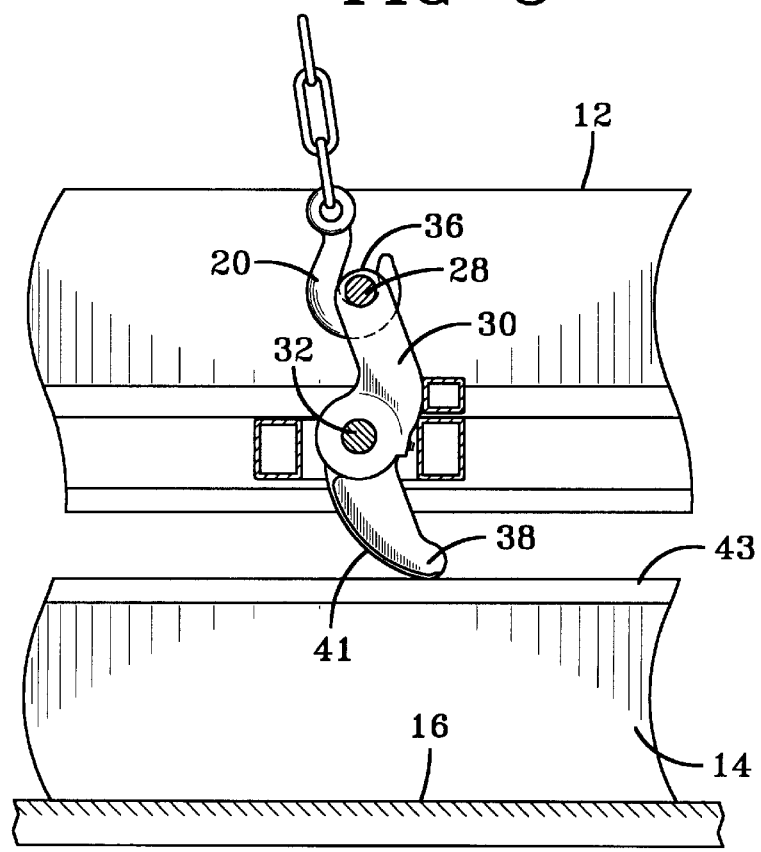
FIG. 6 is a view like FIG. 3 showing the upper mold half separated from the lower mold half with the opening lever in the rotated position.
Figure 4:
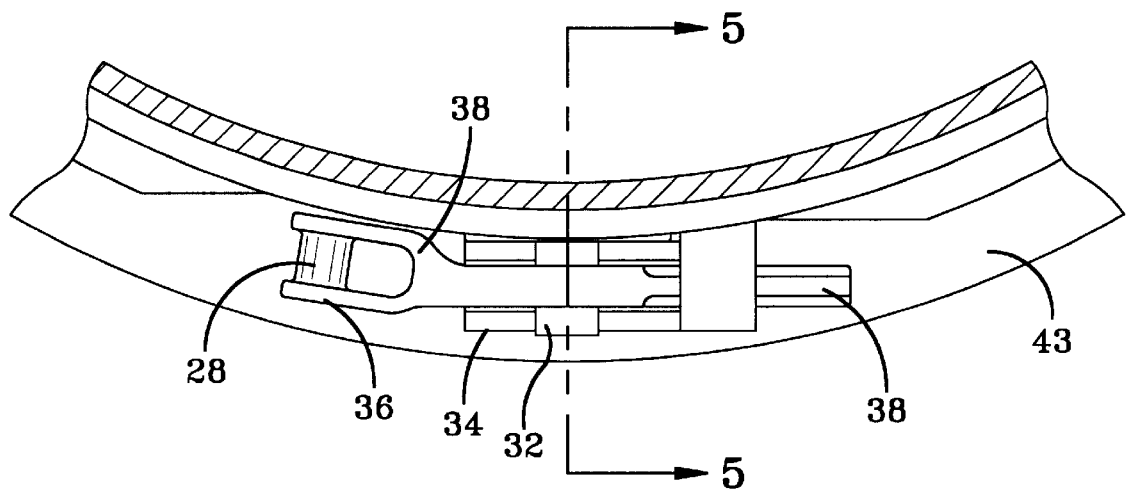
FIG. 4 is a fragmentary sectional view of the opening lever with the hook removed taken along the plane of line 4—4 in FIG. 3.
Figure 5:
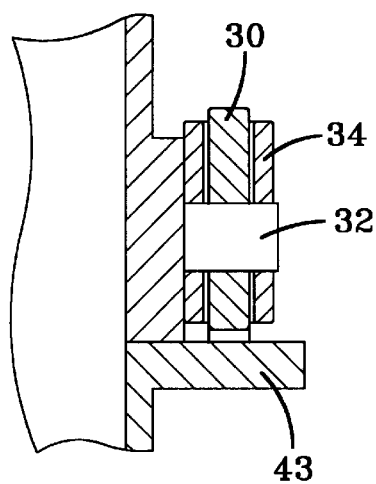
FIG. 5 is a fragmentary sectional view taken along the line 5—5 in FIG. 4.

In operation, the tire mold 10 is placed on the floor 16 after removal from the heater and vulcanization of the tire within the tire mold as shown in FIG. 1. The hook 20 for each chain 22 is placed around the lifting pin 28 with the lever 30 in the position shown in FIG. 3. The hoist cable 26 is then raised, pulling chain 22 and hook 20 upward against the lifting pin 28 on the lifting end 36 of the lever as shown in FIG. 3. The lever 30 is then rotated clockwise to a position shown in FIG. 6 during which time the cam surface 41 of the lever 30 is pressed against the flange 43 of the lower mold half 14. The cam surface 41 provides for greater leverage during the initial rotation of the lever 30 than during the final rotation as shown in FIG. 6. This is desirable because the greatest force is needed to break open the tire mold 10 and separate the upper mold half 12 from the lower mold half 14. Then the lesser force required to separate the tire from the mold halves 12 and 14 is provided by the leach lever 30 which has a shorter effective lever arm. Also the moving coefficient of friction of the lever 30 is less than the static coefficient of friction at the beginning of the lever rotation. After the upper mold half 12 has been separated from the lower mold half 14 as shown in FIG. 2 and in FIG. 6, the upper mold half 12 may be moved by the hoist to another position and the cured tire 45 removed from the lower mold half 14. Alternatively, the upper mold half 12 may be lowered back onto the lower mold half 14 and the hooks 20 for each separating assembly removed from the lifting pin and fastened to an ear 46 on the upper mold half to transfer the upper mold half 12 to another position where the hook 20 for each bracket 34 is retracted when lowered to the floor 16.

While a certain representative embodiment and details have been shown for the purpose of illustrating the invention, it will be apparent to those skilled in the art that various changes and modification may be made therein without departing from the scope of the invention.

What is claimed is:

1. A tire mold opener for separating an upper mold half from a lower mold half wherein a hoist means is positioned above said upper mold half comprising a lever pivotally mounted on said upper mold half having a separating end engageable with said lower mold half, a lifting end engageable with said hoist means for rotating said lever in a direction to press said separating end against said lower mold half while lifting said upper mold half away from said lower mold half to open said tire mold.

2. The tire mold opener in accordance with claim 1 further characterized by a second lever and a third lever pivotally mounted on said upper mold half at circumferentially spaced apart positions from said lever and having a second separating end and a third separating end engageable with said lower mold half, a second lifting end and a third lifting end engageable with said hoist means for rotating said second lever and said third lever in a direction to press said second separating end and said third separating end against said lower mold half.

3. The mold opener of claim 1 further characterized by said separating end of said lever having a curved cam surface engageable with said lower mold half at a position close to a pivot of said lever in the closed position of said mold and engageable with said lower mold half at incremental positions spaced a greater distance from said pivot as said upper mold half is moved away from said lower mold half by said lever.

4. The tire mold opener of claim 3 further characterized by said lifting end of said lever having a lifting pin for engagement with a hook carried by a chain 22 connected to said hoist means.

5. A tire mold opener according to claim 1, wherein said lever is pivotally supported on a pivot pin on a bracket mounted on said upper mold half.

6. The tire mold opener according to claim 5 further characterized by said lower mold half having a flange extending radially outward at a position under said bracket for engagement by said separating end of said lever.

* * * * *